United States Patent
Worth et al.

(10) Patent No.: US 6,189,914 B1
(45) Date of Patent: Feb. 20, 2001

(54) FOLDING STROLLER

(75) Inventors: Ronald K. Worth, Menlo Park; Eric G. Pfaff, Redondo Beach, both of CA (US)

(73) Assignee: Worth Pfaff Innovations, Inc., Menlo Park, CA (US)

( * ) Notice: Under 35 U.S.C. 154(b), the term of this patent shall be extended for 0 days.

(21) Appl. No.: 08/552,595

(22) Filed: Nov. 3, 1995

Related U.S. Application Data

(63) Continuation-in-part of application No. 08/130,319, filed on Oct. 1, 1993, now Pat. No. 5,499,831.

(51) Int. Cl.[7] .............................. B62B 7/08; B62B 7/14
(52) U.S. Cl. ..................... 280/642; 280/643; 280/650; 280/658
(58) Field of Search ................... 280/641, 642, 280/643, 647–650, 47.41, 47.4, 47.38, 47.34, 47.36, 47.39, 30, 657, 658

(56) References Cited

U.S. PATENT DOCUMENTS

| | | |
|---|---|---|
| 2,438,829 | 3/1948 | Skolnik . |
| 3,083,997 | 4/1963 | Chreist, Jr. . |
| 3,829,113 | 8/1974 | Epelbaum . |
| 4,007,947 * | 2/1977 | Perego .......................... 280/650 |
| 4,435,012 | 3/1984 | Kassai . |
| 4,537,414 | 8/1985 | Nusbaum . |
| 4,570,956 | 2/1986 | Dyer . |
| 4,606,550 | 8/1986 | Cone . |
| 4,610,460 * | 9/1986 | Kassai ............................ 280/650 |
| 4,660,850 * | 4/1987 | Nakao et al. .................. 280/642 |
| 4,681,340 * | 7/1987 | Pasquini ........................ 280/647 |
| 4,750,783 | 6/1988 | Irby et al. . |
| 4,768,795 | 9/1988 | Mar . |
| 4,770,437 | 9/1988 | Glaser . |
| 4,822,064 | 4/1989 | Hunter . |
| 4,834,403 | 5/1989 | Yanus et al. . |
| 4,852,894 | 8/1989 | Dyer . |
| 4,872,693 | 10/1989 | Kennel . |
| 4,874,182 | 10/1989 | Clark . |
| 4,878,680 | 11/1989 | Molnar . |
| 4,896,894 | 1/1990 | Singletary . |
| 4,907,818 | 3/1990 | Chai . |
| 4,915,401 | 4/1990 | Severson et al. . |
| 4,921,261 | 5/1990 | Salder, Jr. et al. . |
| 5,106,116 * | 4/1992 | Chen ............................... 280/642 |
| 5,201,535 | 4/1993 | Kato et al. . |
| 5,472,224 * | 12/1995 | Cabagnero ..................... 280/642 |

* cited by examiner

*Primary Examiner*—Anne Marie Boehler
(74) *Attorney, Agent, or Firm*—Brinks, Hofer, Gilson & Lione

(57) ABSTRACT

A stroller that accepts and supports various types of child's car seats is easily converted from its operational state to its storage state by actuating a latching mechanism. The stroller includes a lever which facilitates the removal of the child's car seat. A seat assembly can be attached to the stroller to convert the stroller from a child's car seat carrier to a toddler stroller. The seat assembly remains in the upright position when the stroller is converted from the storage state to the operational state.

11 Claims, 13 Drawing Sheets

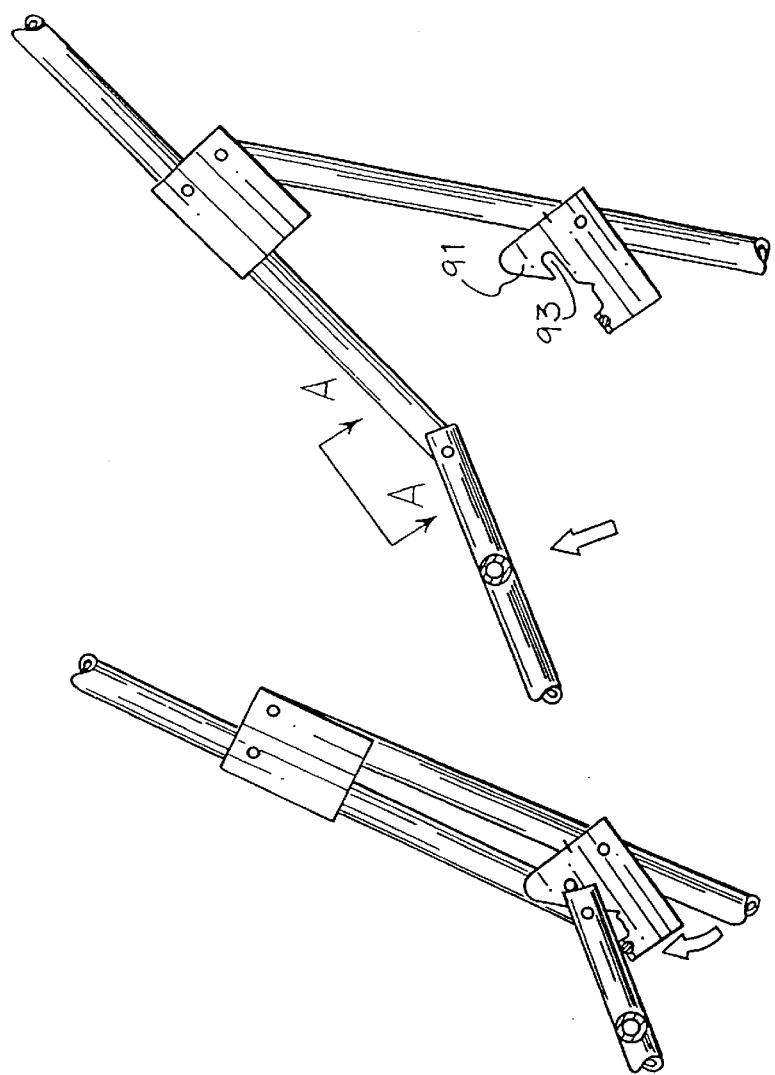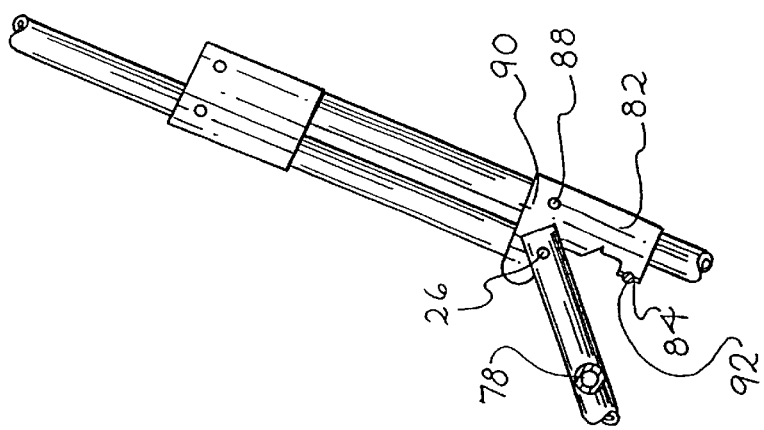

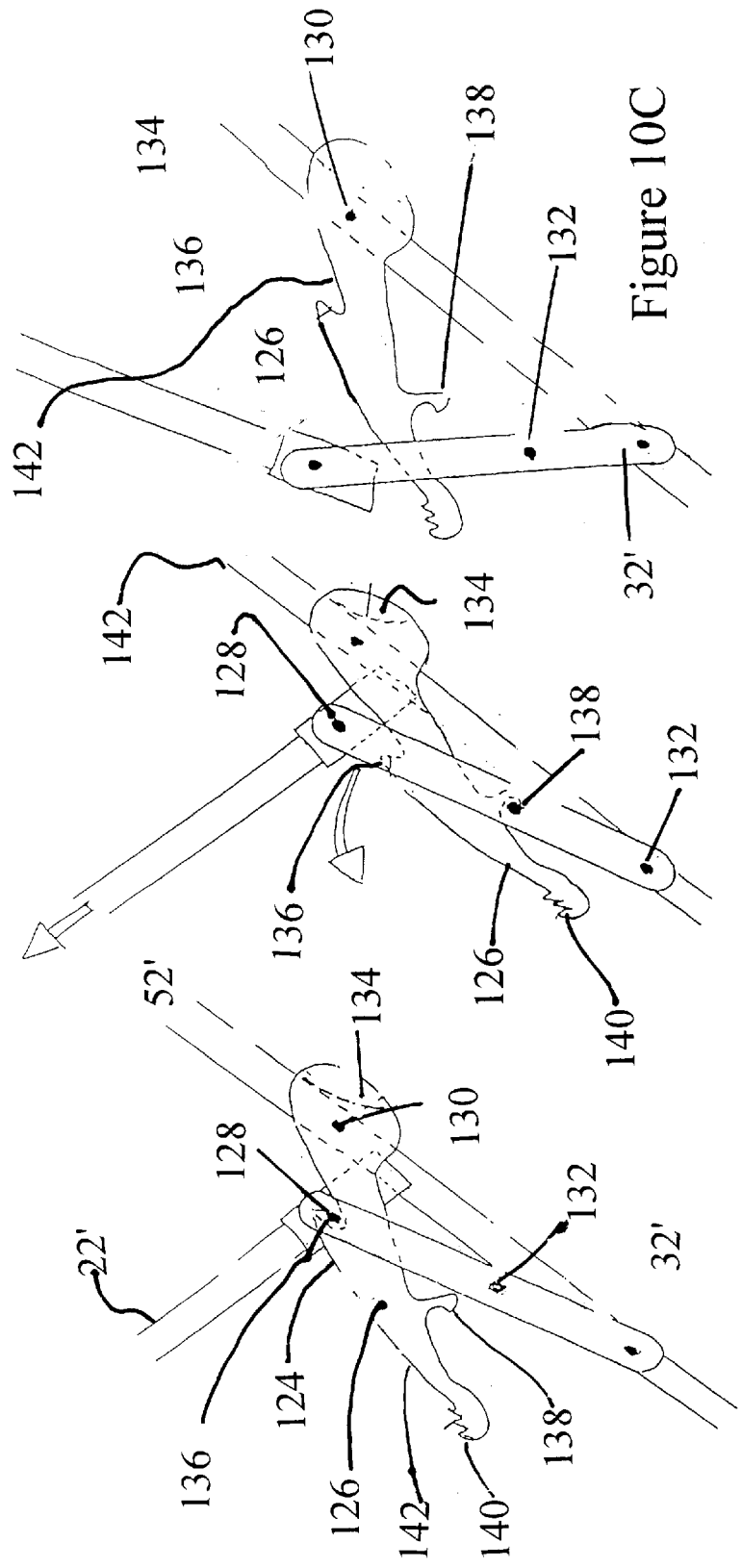

FOLDING STROLLER

This application is a continuation-in-part of application Ser. No. 08/130,319, filed Oct. 1, 1993, now U.S. Pat. No. 5,499,831 the disclosure of which is hereby incorporated by reference.

BACKGROUND OF THE INVENTION

The field of invention relates generally to a stroller and particularly to a child's stroller with an easy folding frame that quickly receives or releases conventional child car seats and which can be converted into a toddler stroller.

Although child's strollers that receive or convert into child's car seats are well known in the prior art, there are still many problems inherent with the existing designs. Some inventions, such as described in U.S. Pat. No. 4,822,064 issued to Hunter, describe a child's car seat that converts from a car seat into a stroller. The frame assembly and the wheel assembly in this type of design are attached to the car seat, which acts to increase the total weight of the apparatus even when the wheel assembly is not in use. A further disadvantage inherent in this type of design is that any dirt or mud acquired while using the device as a stroller is subsequently deposited in the car when the device is converted and used as a child's car seat.

The prior art also includes child's strollers in which the seat may be removed and used as a child's car seat. However, these inventions, such as described in U.S. Pat. No. 4,768,795 issued to Mar, utilize car seats that must have specialized designs to enable their use on both a stroller and in an automobile. Also, inventions utilizing this type of technology, such as described in U.S. Pat. No. 4,921,261 issued to Sadler, Jr., are difficult to convert from child's stroller to the child's car seat, making the conversion impractical in inclement weather.

Another drawback of existing strollers that receive or convert into child's car seats are their limited useful life as the child becomes a toddler. In existing child's strollers, when a child becomes a toddler, a new stroller must be used to transport the toddler.

The present invention allows the use of existing, commercially available child's car seats, thus reducing the overall cost, especially for families that have already purchased a child's car seat. The present invention is also designed for quick and easy removal of the child's car seat and a simple one-hand conversion of the stroller from an operative state to a storage state.

The present invention also allows the stroller in the child's car seat carrier mode to be converted into a toddler stroller by removing the cross bars and attaching a seat assembly. Once converted, the seat assembly can be utilized in an upright seat position or in a reclining position.

SUMMARY OF THE INVENTION

In view of the above-mentioned disadvantages inherent in the prior art for child's strollers, the present invention provides a child's stroller that contains all of the advantages of the prior art while including none of the disadvantages.

It is a primary object of the present invention to provide a stroller which accepts and supports existing child car seats. The stroller is made up of a simple, yet sturdy frame which will have low manufacturing costs and still provide the strength necessary to support a child's car seat and a child.

It is another object of the present invention to provide a stroller that accepts several existing child car seats, reducing the cost to the consumer who may have previously purchased a child's car seat.

It is another object of the present invention to allow the transfer of a child in a child's car seat from an automobile to a stroller without removing the child from the child's car seat.

It is another object of the present invention to provide a stroller with a locking mechanism that can be quickly folded into its storage state in a single one-handed movement, or unfolded into its operative state again in a single movement.

It is another object of the present invention to provide a stroller that will allow the quick and easy removal of the child's car seat using one hand to release the child's car seat from the stroller and the other hand to simultaneously remove the child's car seat from the stroller.

It is another object of the present invention to provide a stroller that can be converted into a toddler stroller using a seat assembly. The seat assembly can be utilized in an upright seat position or in a reclining motion.

It is another object of the present invention to provide a stroller with a seat assembly that will remain in an upright seat position when the stroller is converted from its storage state to its operational state.

It is another object of the present invention to provide a stroller with a latching mechanism that will facilitate the conversion of the stroller from the operational state to the storage state.

Further objectives and advantages of this invention will become apparent on examination of the following description with reference to the accompanying drawings.

BRIEF DESCRIPTION OF THE DRAWINGS

FIGS. 4A, 4B, and 4C are exploded views of the locking hinge assembly as the stroller of FIG. 1 moves from its operational state towards its storage state;

FIGS. 10A, 10B and 10C are exploded views of a latching mechanism as the stroller of FIG. 9A moves from its operational state to its storage state.

DETAILED DESCRIPTION OF THE PREFERRED EMBODIMENTS

Figure 1:
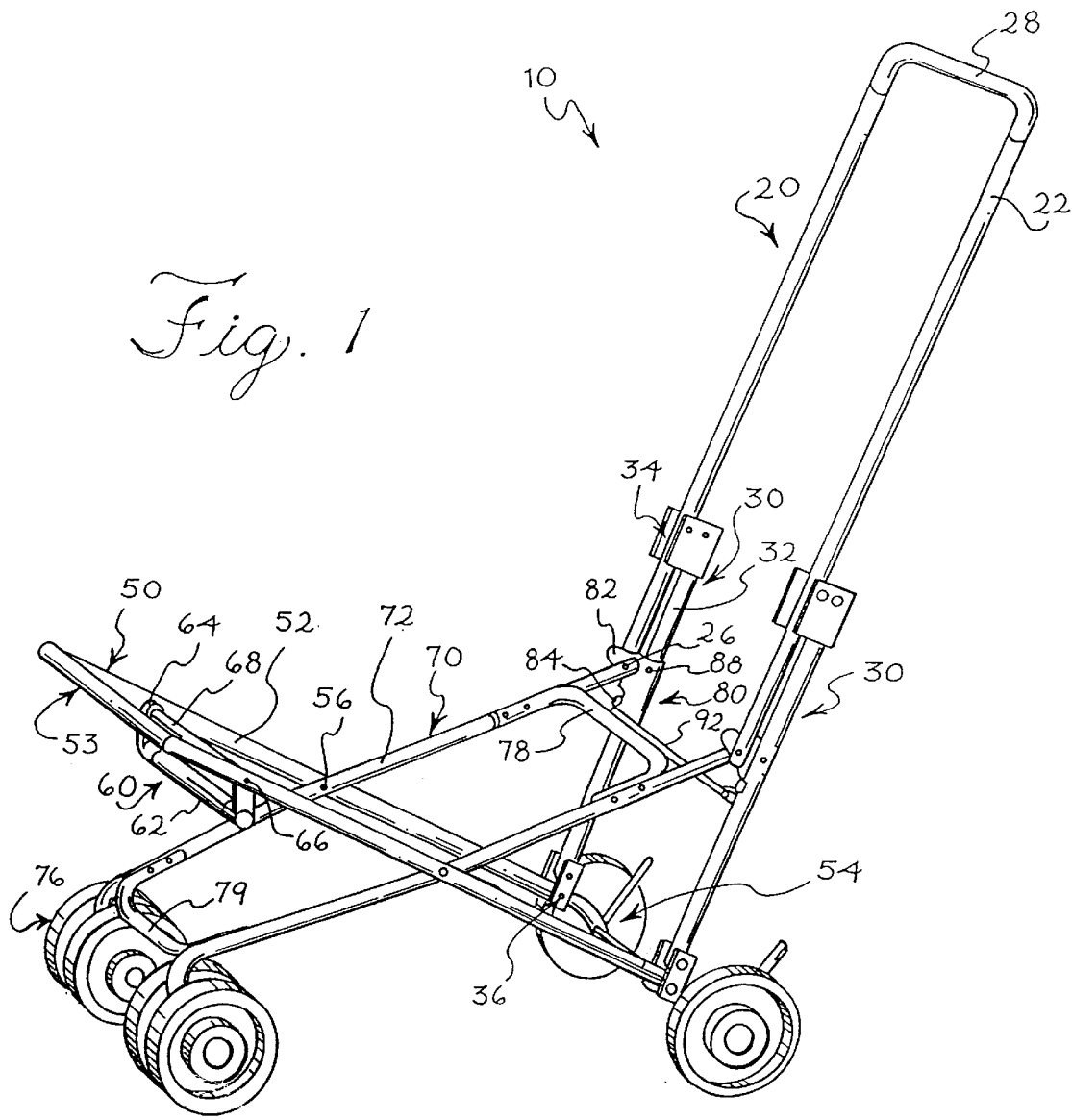
FIG. 1 is a perspective view of a preferred embodiment of a stroller according to the present invention in its operative state.
Figure 2:
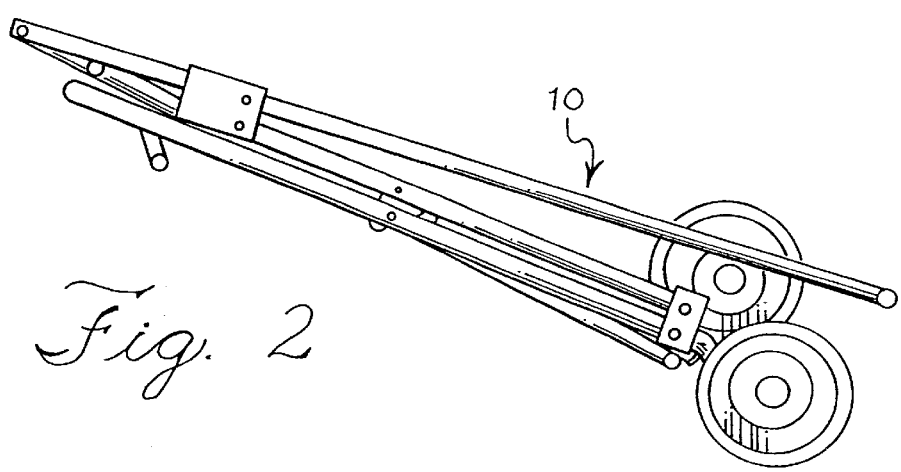
FIG. 2 is a perspective view of the stroller of FIG. 1 after conversion to its storage state.

One preferred stroller apparatus 10 of the present invention, shown in FIG. 1 in its operative state, is made up of a handle frame section 20, two back bar sections 30, a rear wheel frame section 50, and a front wheel frame section 70. The stroller apparatus 10 is shown in FIG. 2 in its storage state. The term stroller is used to define a child's stroller or a child's carriage. The preferred embodiment of the stroller apparatus is symmetrical left to right. Unless otherwise specified, the left side of the stroller will be described. It should be appreciated that the right side of the stroller would be described in the same manner as the left side.

Figure 7:
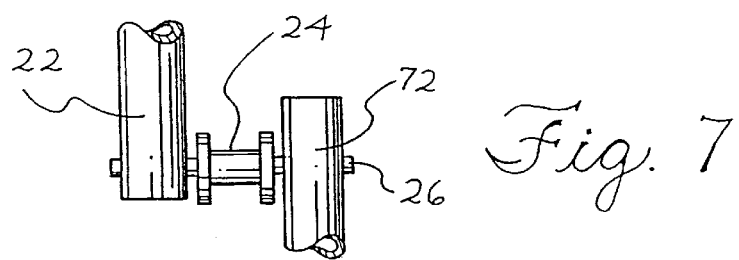
FIG. 7 is a detailed front view taken along line A—A of FIG. 4C.

FIG. 1 shows a handle frame section 20 which consists of a U-shaped bar 22, a handle grip 28, a latch hinge pin 26 and a latch bushing 24 (see FIG. 7). At the mid-section of the U-shaped bar 22 is the handle grip 28 which is utilized to move the stroller. Opposite the handle grip 28, at the end of the U-shaped bar 22 is the latch hinge pin 26 and the latch bushing 24. The latch hinge pin 26 fastens the front wheel frame section 70 to the handle frame section 20. The latch bushing 24 allows for a space between the front wheel frame section 70 and the handle frame section 20 for the latch hinge 82 to attach when the stroller 10 is in the operative state. Between the handle grip 28 and the latch hinge pin 26 is attached the top hinge assembly 34. The handle frame section provides support for the stroller while also providing an interface between the stroller and the user.

Also shown in FIG. 1 is the back bar section 30. The back bar section 30 includes a back bar 32 with a top hinge assembly 34 attached at the top end. At the opposite end of the back bar section 32 is attached the bottom hinge assembly 36. Between the top hinge assembly 34 and the bottom hinge assembly 36 is a pivot pin 88. The pivot pin 88 is utilized to hold the locking hinge assembly 80 while allowing the locking hinge assembly 80 the freedom to rotate about the pivot pin 88.

The locking hinge assembly 80, as shown in FIGS. 1, 4 and 7, is actuated to lock the stroller into its operative state. The locking hinge assembly 80 consists of two locking hinges 82, each having a chamfer 91, an indenture 93, and a restricting tab 84, a pivot pin 88, a spring 90 and a locking hinge bar 92, which is used to unlock the locking hinge assembly 80. The locking hinge assembly 80 is attached to the back bar 32 by the pivot pin 88. The pivot pin 88 allows the locking hinge 82 to rotate freely. The locking hinge assembly 80 locks when the indenture 93 engages the latch bushing 24 which is attached to the latch hinge pin 26. The helical spring 90 forces the locking hinge 82 around the pivot pin 88, while the restricting tab 84 limits the travel of the locking hinge 82. The restricting tab 84 positions the locking hinge 82 in such a manner that when the stroller 10 is converted from the storage state to the operational state the chamfer 91 automatically slides as a cam against the latch bushing 24 which rotates the locking hinge until the indenture 93 slides over the latch bushing 24. The indenture 93 is oriented in such a way that it locks onto the latch bushing 24, which prohibits rotation of the handle frame section 20 about the top hinge assembly 34, thereby locking the stroller in the operational position.

Returning to FIG. 1, the rear wheel frame section 50 consists of a rear wheel frame 52, rear wheel assembly 54, a scissors hinge pin 56 and a lever assembly 60. Attached near one end of the rear wheel frame 52 is the bottom hinge assembly 36 and the rear wheel assembly 54. While, near the opposite end of the rear wheel frame 52, is the lever assembly 60. The lever assembly 60 consists of two pivoting caps 64, a release lever 62, a hinge rod 66 and a hinge rod sheath 68. The hinge rod 66 is attached to the rear wheel frame 52. The release lever 62 is rotatively connected, via the pivoting caps 64 to the hinge rod 66. The hinge rod sheath 68 covers over the hinge rod 66 enlarging the overall circumference of the hinge rod 66 thereby creating a better fit between the hinge rod 66 and the child's car seat 12 when the child's car seat is placed on the stroller 10. The release lever 62, as will be seen later, is actuated to easily remove the child's car seat.

The front wheel frame section 70 consists of the front wheel frame 72, the front wheel assembly 76, the upper support bar 78 and the lower support bar 79. The front wheel assembly 76 is attached at one end of the front wheel frame 72 such that the front wheel assembly 76 will fold compactly when the stroller is converted to its storage state. The latch hinge pin 26 attaches the other end of the front wheel frame 72 to the end of the handle frame 20 opposite the handle grip 28. Near the front wheel assembly 76 is located a lower support bar 79, and near the opposite side of the front wheel frame section 70 is located an upper support bar 78. The support bars 78, 79 are used to support the stroller 10. Also, upper support bar 78 is utilized to support a child's car seat 12 when received by the stroller 10, and as a handle to assist in converting the stroller from the operational position to the storage position. The front wheel frame 72 is shaped in such a way as to inset the front wheel assembly 76 for compact folding inside the rear wheel assembly 54 in the storage state.

The handle frame section 20 is connected to the back bar section 30 via the top hinge assembly 34. Furthermore, the back bar section 30 is attached to the rear wheel frame section 50 by the bottom hinge assembly 36. Finally, the front wheel frame section 70 and the rear wheel frame section 50 are connected approximately mid-way between by the scissors hinge pin 56, allowing each section to move in a scissors-like motion with respect to the other section.

In accordance with the above-described stroller apparatus 10, the four hinges; the latch hinge pin 26, the top hinge assembly 34, the bottom hinge assembly 36 and the scissors hinge pin, along with the U-shaped bar 22, back bar 32, rear wheel frame 52 and the front wheel frame 72, comprise a four-bar linkage which allows the stroller to fold compactly, as will be described later, into its storage state.

The stroller design allows for easy conversion from its operational state to its storage state using one hand in a single motion. Refer to FIG. 2, a side view of the stroller 10 in its storage state, and FIGS. 4A, 4B and 4C a sequence showing the locking hinge assembly 80 in three stages of the disengagement process.

FIGS. 4A, 4B, 4C show the conversion of the stroller from the operative state to the storage state. To begin the conversion to the storage state, the user grasps both the locking hinge bar 92 and the upper support bar 78 with one hand.

As shown in FIG. 4B, the user then moves the locking hinge bar 92 towards the upper support bar 78, thereby stretching the spring 90 and rotating the locking hinge 82 around the pivot pin 88. As the locking hinge 82 rotates, the indenture 93 in the locking hinge 82 will disengage the latch bushing 24, unlocking the locking hinge 82 and allowing the stroller 10 to begin converting to its storage state.

Next, as shown in FIG. 4C, the user, in the same motion and using the same hand, lifts upwardly on the upper support bar 78. Lifting the upper support bar 78, in conjunction with the force of gravity, causes the handle grip 28 of the handle frame section 20 to move in a downward motion, while bringing the upper end of the rear wheel frame 52, where the lever assembly is attached, upwards and towards the support bar 78. The user simultaneously releases the locking hinge bar 92 which springs back until restrictive tab 84 hits the back bar 32, thereby positioning the locking hinge 82 for automatic locking the next time the stroller 10 is converted back to the operative state. As the upper support bar 78 moves higher the stroller 10 continues to collapse until it reaches its storage state. Although the left side is shown here, the same procedure is simultaneously taking place on the right side. Furthermore, it can be appreciated that a locking hinge assembly can be effectuated utilizing only one side of the stroller.

Figure 3:
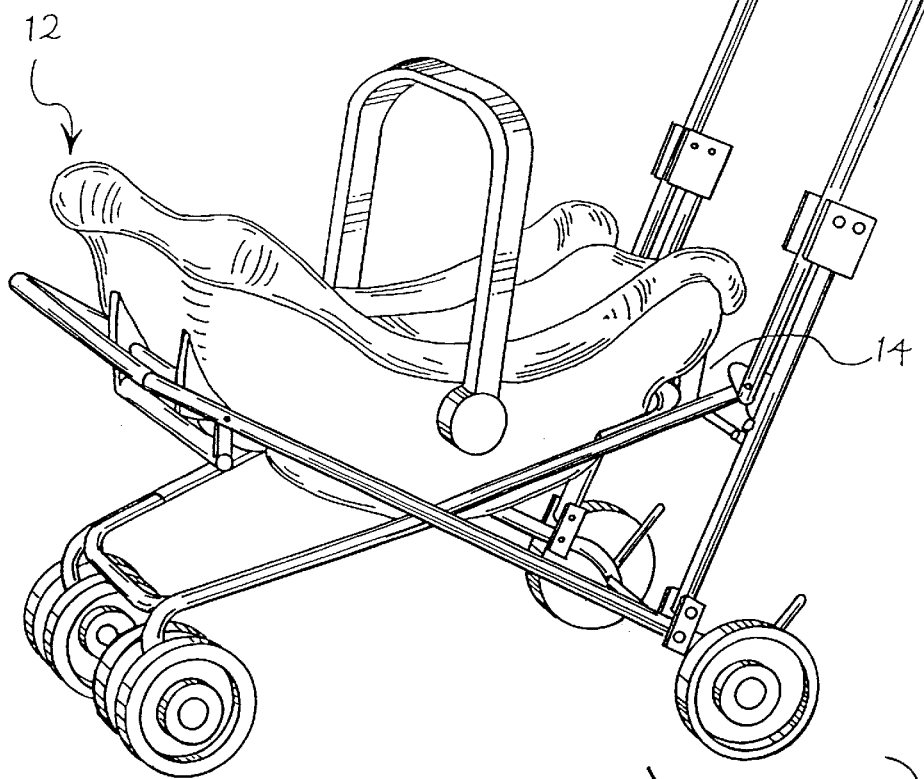
FIG. 3 is a perspective view of the stroller of FIG. 1 after receiving a child's car seat.

FIG. 3 shows the stroller 10 in the present invention in its operative state after receiving a child's car seat 12. The child's car seat 12 shown in FIG. 3 is similar to the Century 590 child's car seat which includes a stationary flange 14, along with stationary tabs 16 and movable tabs 18 (only one shown). The stationary and movable tabs 16, 18 act to lock the child's car seat 12 around any object that fits in between the tabs.

The child's car seat 12 is prevented from rotating around the hinge rod sheath 58 by the rear wheel frame mid-section 53, thus preventing the child's car seat 12 from accidentally flipping over the front of the stroller 10.

The stroller 10, in its operational state, receives a child's car seat 12 by the user placing the child's car seat 12 such that the hinge rod sheath 68 slides between the stationary tab 16 and the movable tab 18 of the child's car seat 12. This action will lock the child's car seat 12 to the stroller. At the same time, the stationary flange 14 on the child's car seat 12 will hook over the upper support bar 78, which provides support for the child's car seat 12.

Removal of the child's car seat 12 from the stroller 10 is greatly simplified by the lever assembly 60. This device, operable with one hand, can simultaneously depress both movable tabs, leaving the user with a free hand to lift the child's car seat 12 off the stroller 10. The left and right movable tabs are relatively far apart, and both movable tabs must be depressed simultaneously to release the child's car seat 12. Without the lever assembly 60, it is very difficult to release the left and right movable tabs and simultaneously lift the child's car seat 12 off the stroller 10.

Figures 5A, 5B, 5C:
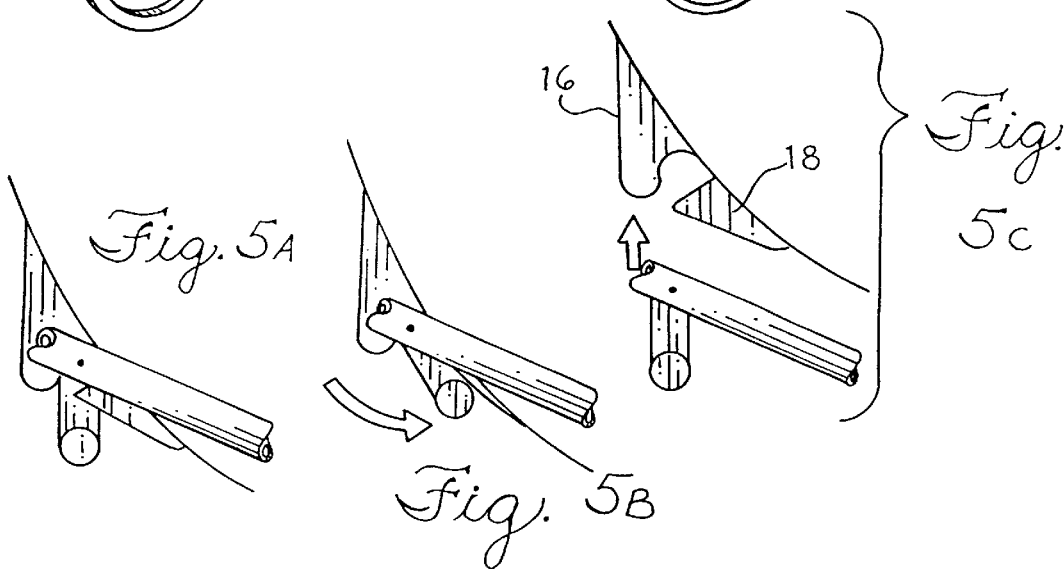
FIGS. 5A, 5B and 5C are exploded views of the lever assembly on the stroller of FIG. 1 as the lever assemble rotates to allow easy removal of the child's car seat.

FIGS. 5A, 5B and 5C show the actuation of the lever assembly 60 when the child's car seat 12 is to be removed from the stroller 10. As described above and shown in FIG. 5A, when the child's car seat 12 is received by the stroller 10 the stationary tabs 16 and movable tabs 18 act to lock the child's car seat 12 in place on the hinge rod sheath 68. To remove the child's car seat 12, the release lever 62 is rotated around the hinge rod 66 in the direction of the left and right movable tabs 18. As the release lever 62 contacts both movable tabs 18, the movable tabs will move toward the child's car seat 12 thereby allowing the child's car seat the freedom to be released from the stroller as shown in FIG. 5B. Although only one tab 18 is shown, it can be appreciated that the two tabs 18 located on the child's car seat 12 are simultaneously depressed to release the child's car seat 12. Finally, as shown in FIG. 5C, the child's car seat 12 can be lifted with the other hand upwardly away from the hinge rod sheath 68 and away from the stroller 10. Once the child's car seat 12 is removed, the stroller 10 can be converted from its operational state to its storage state.

The locking hinge assembly 80 is automatically activated when the stroller 10 is converted from its storage state to its operational state (refer to FIG. 4 and FIG. 7). As the stroller 10 is being converted to its operational state, the chamfer 91 on the locking hinge 82 comes in contact with the latch bushing 24, causing the locking hinges 82 to pivot about the pivot pin 88, which stretches the spring 90 (FIG. 4B). When the latch bushing 24 is adjacent to the indenture 93, the spring 90 causes the locking hinge 82 to pivot such that the indenture 93 engages the latch bushing 24 (FIG. 4A), preventing the stroller 10 from converting to its storage state.

Figure 6:
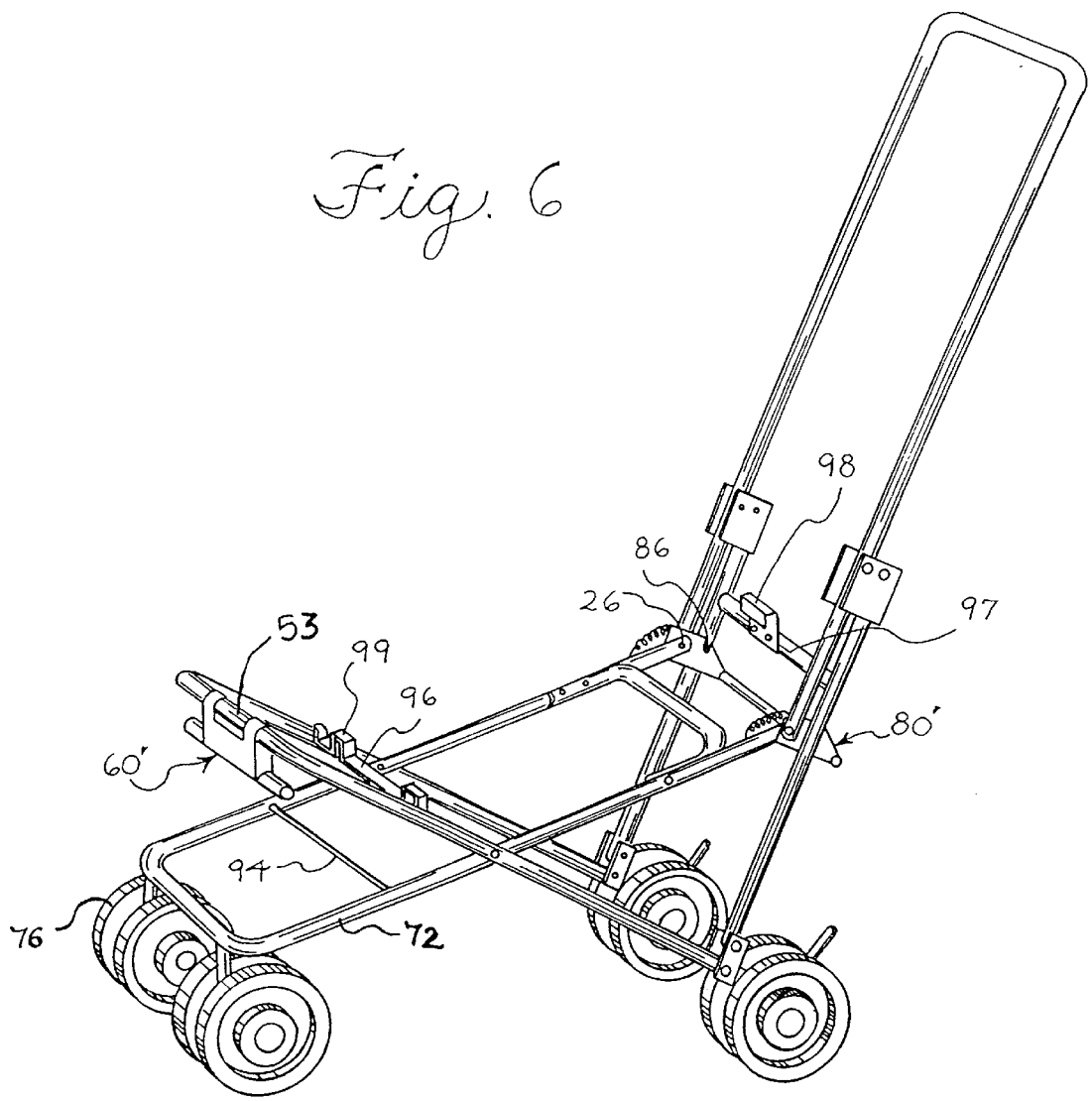
FIG. 6 is a perspective view of alternative embodiments of a stroller according to the present invention in its operative state.

There are two alternative embodiments of the present invention that allow the stroller 10 to adapt to other types of child's car seats. FIG. 6 shows these two alternative embodiments, along with several other alternative embodiments discussed later.

Figure 8:
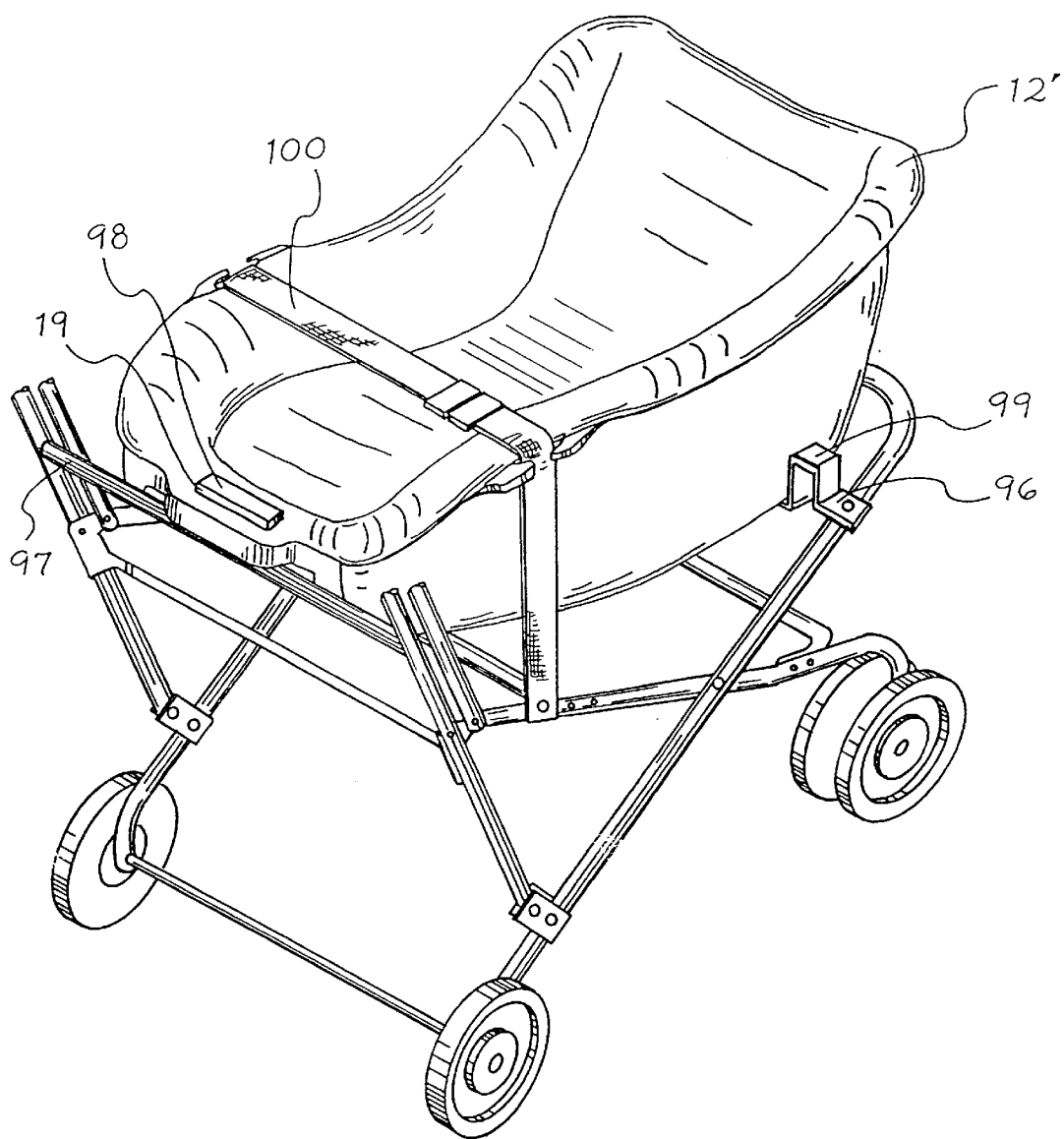
FIG. 8 is an perspective view of the stroller of FIG. 6 after receiving a child's car seat.

The first alternative embodiment of the present invention allows the stroller to adapt to any child's car seat with a hand grip opening, such as the Evenflo Joy Ride. Refer to FIG. 8, which shows this alternative embodiment after receiving a child's car seat. In FIG. 8 the handle frame section 20 and back bars 32 are cut away for clarity.

By attaching a main support bar 96, a handle support bar 97 with an attached handle support bar post 98, and a seat belt 100 to the stroller 10, any child's car seat with a hand grip opening 19 can be secured to the stroller 10. In this alternative embodiment, the user attaches the child's car seat 12' by placing it onto the main support bar 96 and the handle support bar 97 such that the handle support bar post 98 protrudes through the hand grip opening 19 as shown, then fastening the seat belt 100. The main support bar 96 supports the weight of the child's car seat 12', while the two main support bar tabs 99 restrict unwanted side to side movement of the head end of the child's car seat 12'. The handle support bar 97 supports the weight of the child's car seat 12', while the handle support bar post restricts unwanted side to side movement of the foot end of the child's car seat 12'. The handle support bar post also restricts unwanted front to back movement of the child's car seat 12'. The seat belt 100 holds the child's car seat 12' firmly down on the main support bar 96 and the handle support bar 97 so that the child's car seat 12' cannot move in any direction even if the stroller 10 is jarred. The user removes the child's car seat 12' by releasing the seat belt 100 and lifting the child's car seat off the stroller.

The second alternative embodiment of the present invention shown in FIG. 6, allows the stroller 10 to adapt to any child's car seat with an integral locking mechanism that is easily released by the user, such as the Fisher Price infant car seat (not shown). By attaching a stationary bar 94 to the front wheel frame 72, near the front wheel assembly 76, any such child's car seat can be secured to the stroller. In this alternative embodiment, the user attaches the child's car seat by locking the integral locking mechanism onto the stationary bar 94 and setting the opposite end of the child's car seat onto the upper support bar 78. The user removes the child's car seat by unlocking the integral locking mechanism and lifting the child's car seat off the stroller.

The child's car seat is prevented from rotating around the stationary bar 94 by the rear wheel frame mid-section 53, thus preventing the child's car seat from accidentally flipping over the front of the stroller 10.

It can be appreciated that the stationary bar 94 can span the left and right sides of the stroller at other locations depending on the exact geometry of the child's car seat, thus allowing the stroller to adapt to any number of existing child's car seats with integral locking mechanisms. It can also be appreciated that the stationary bar 94 can be used in conjunction with the handle support bar 97, and the handle support bar post 98 for child's car seats that have both an integral locking mechanism and a hand grip opening 19.

Still another alternative embodiment can be seen in FIG. 6. The locking hinge assembly 80' can be attached to the intersection between the handle frame section 20 and the front wheel frame section 70. In this embodiment the locking hinge 82 would rotate freely around the latch hinge pin 26 and, instead of a pivot pin 88, the back bar 32 would have a locking tab 86 to engage the indenture 93 of the locking hinge 82. As the stroller 10 converted from its operative state to its storage state, the locking hinge assembly 80 would travel upwardly with the intersection of the handle frame section 20 and the front wheel frame section 70.

Also, the lever assembly 60' could be mounted at the end of the rear wheel frame section 50 thereby acting as both a support for the rear wheel frame section 50 and a support for the child's car seat 12 received by the stroller 10.

Figure 9A:
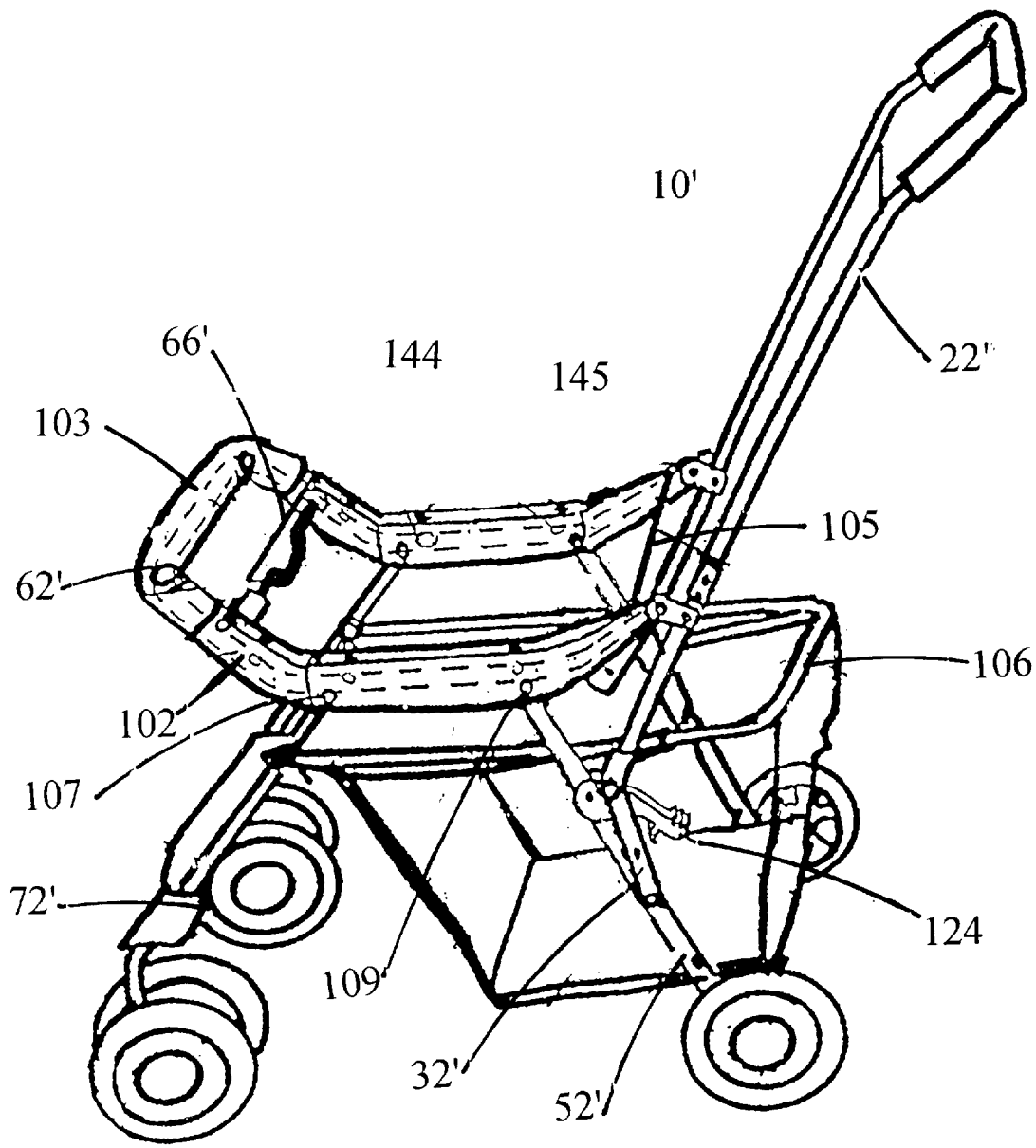
FIG. 9A is a perspective view of another alternative embodiment of a stroller prior to receiving a child's car seat.

Another alternative embodiment of the present invention will allow the stroller which accepts car seats to convert to a conventional child's and toddler stroller. This embodiment is seen in FIG. 9A (in its car seat carrier mode), 9B (the seat assembly), and 9C (the stroller after conversion to a child/toddler stroller). As seen in FIG. 9A, the frame of the stroller 10' consists of a U-shaped handle bar 22' which is connected at each end to two rear wheel frames 52' by a back bar 32'. The U-shaped handle bar 22' also connects to each end of a U-shaped side bar 102 (dotted line) which is covered by side covers 104. Two front wheel frames 72' are connected to the side covers 104 using front pivoting hinge holes 107 near the front of the U-shaped side bar 102. The two rear wheel frames 52' are connected to the side covers 104 using rear pivoting hinge holes 109 near the back of the U-shaped side bar 102. Alternatively, the two front wheel frames 72' and the two rear wheel frames 52' can be connected to the U-shaped side bar 102 using a pivoting hinge (not shown). A U-shaped basket bar 106 is connected at its ends to each of the front wheel frames 72' and in two places to the U-shaped handle bar 22'.

It can be seen that two-four bar linkages are utilized. The first four bar linkage consists of the U-shaped handle bar 22', the U-shaped side bar 102, the rear wheel frame 52' and the back bar 32'. The second four bar linkage consists of the U-shaped basket bar 106, the U-shaped handle bar 22', the U-shaped side bar 102 and the front wheel frame 72'.

The locking hinge assembly 80 from the previous embodiments has been replaced by a latching mechanism 124. A close up of the latching mechanism 124 can be seen in FIG. 10A. The latching mechanism 124 is used to lock the stroller 10' in the operational state and prevent the stroller 10' from converting to the storage state during normal use. The latching mechanism 124 uses a catch for holding a latch 126 in a position such that the stroller 10' can be converted from its operational state to its storage state. In the preferred embodiment, the latching mechanism 124 consists of a latch 126, a latch pin 128, a pivot pin 130 and a holding pin 132. The latch 126 is a single piece of plastic which consists of a cantilever latch spring 134 (dotted line), a latch hook 136, a holding hook 138, a foot pedal 140 and a cam surface 142.

The latch 126 is connected to the rear wheel frame 52' by a pivot pin 130. The latch pin 128 is located near the end of the U-shaped handle bar 22' where the U-shaped handle bar 22' meets the back bar 32'. The holding pin 132 is located near the middle of the back bar 32'.

To convert the stroller from the operational state to the storage state, pressure is applied to the foot pedal 140, to overcome the force of the cantilever latch spring 134 forcing the latch 126 downward until the holding hook 138 engages the holding pin 132. The resulting position of the latch 126 is shown in FIG. 10B. At this point, the latch hook 136 is disengaged from the latch pin 128. There is no need to continue placing pressure on the foot pedal 140 because the holding hook 138 will remain engaged with the holding pin 132 even after pressure is removed from the foot pedal 140. The stroller 10' can now be converted from the operational state to the storage state by moving the U-shaped side bar mid-section 103 up towards the middle of the U-shaped handle bar 22' (see FIGS. 15A, 15B, 15C). As the stroller 10' converts from its operational state to its storage state, the holding pin 132, which is connected to the back bar 32', and the holding hook 138 of latch 126, which is connected to the rear wheel frame 52', disengage due to the action of the four bar linkage (see arrow on FIG. 10B). The latch spring 134 then forces the latch 126 back into its original position, as seen in FIG. 10C.

When the stroller is converted from its storage state to the operational state, the U-shaped side bar mid-section 103 is moved away from the middle of the U-shaped handle bar 22'. During this action, the cam surface 142 of the latch 126 slides against the latch pin 128, forcing the latch 126 to pivot about the pivot pin 130, thus energizing the latch spring 134, until the latch hook 136 moves beyond the latch pin 128. At that point, the latch spring 134 springs back and the latch hook 136 engages the latch pin 128. As seen in FIG. 10A, the stroller 10' is now locked in its operational state. Other embodiments can be achieved using variations or modifications, including placing the latching mechanism 124 on the U-shaped handle bar 22' and engaging and disengaging the rear wheel frame 52'.

Figure 11:
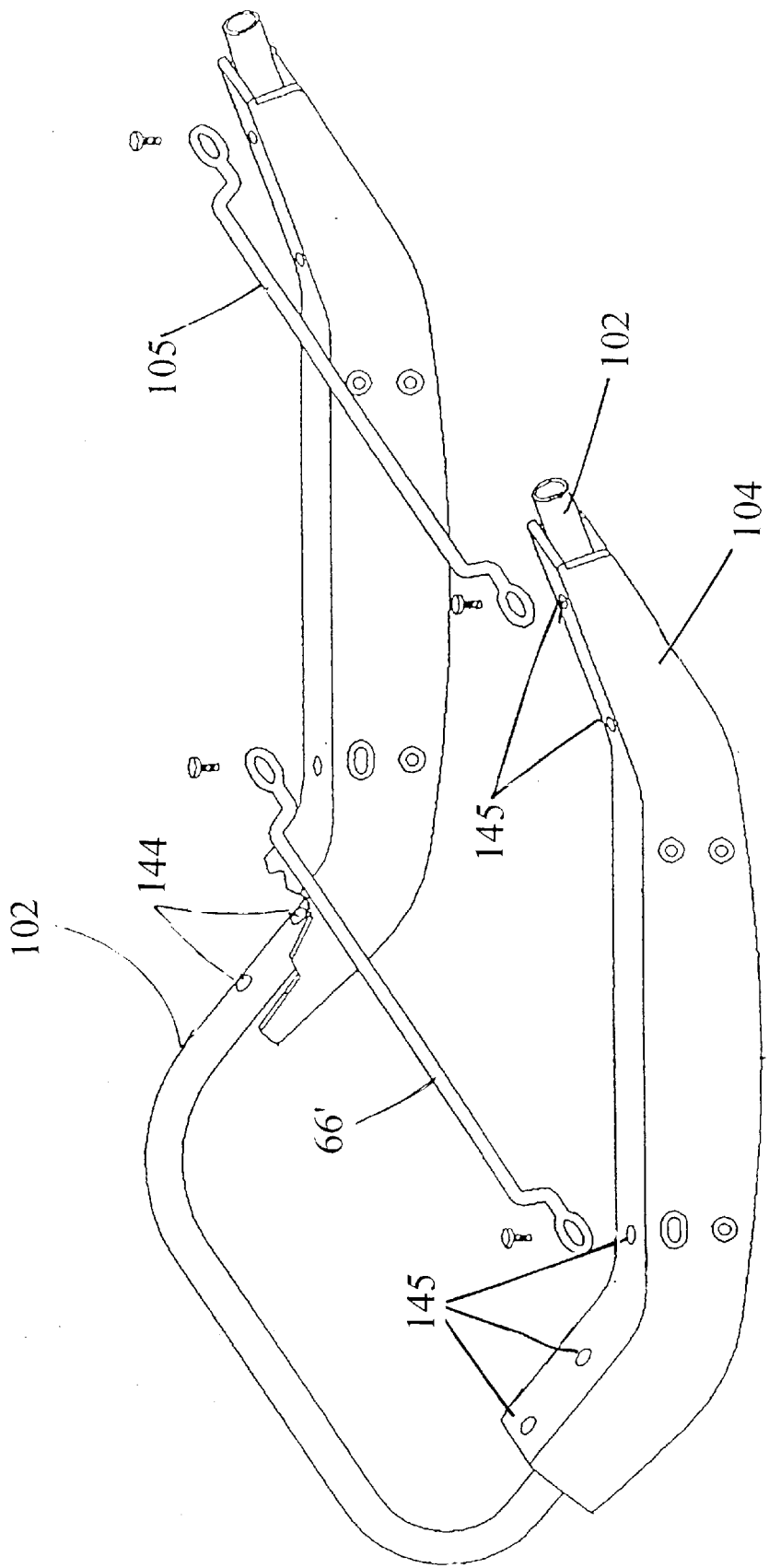
FIG. 11 is a detailed view of a side cover used on the stroller of FIG. 9A.

FIG. 11 shows the side covers 104 that are mounted over the U-shaped side bar 102. The U-shaped side bar 102 has multiple accessory mounting holes 144 (some not shown) for converting the stroller 10', and allowing the stroller 10' to accept different child's car seats. This is accomplished by mounting cross bars (the hinge rod 66' and the rear cross bar 105, among others) to selected accessory mounting holes 144 depending on the type of child's car seat to be supported by the stroller 10'. For example, FIG. 11 shows how cross bars are screwed to a set of accessory mounting holes 144 on the U-shaped side bar 102, through a set of accessory through holes 145 on the side cover 104, in order to accommodate one of many types of infant car seats. FIG. 9A shows another configuration where the hinge rod 66' (with release lever 62' attached) and rear cross bar 105 are attached to the U-shaped side bar 102 using a different set of accessory mounting holes 144 in order to accommodate another type of child's car seat.

Figure 16:
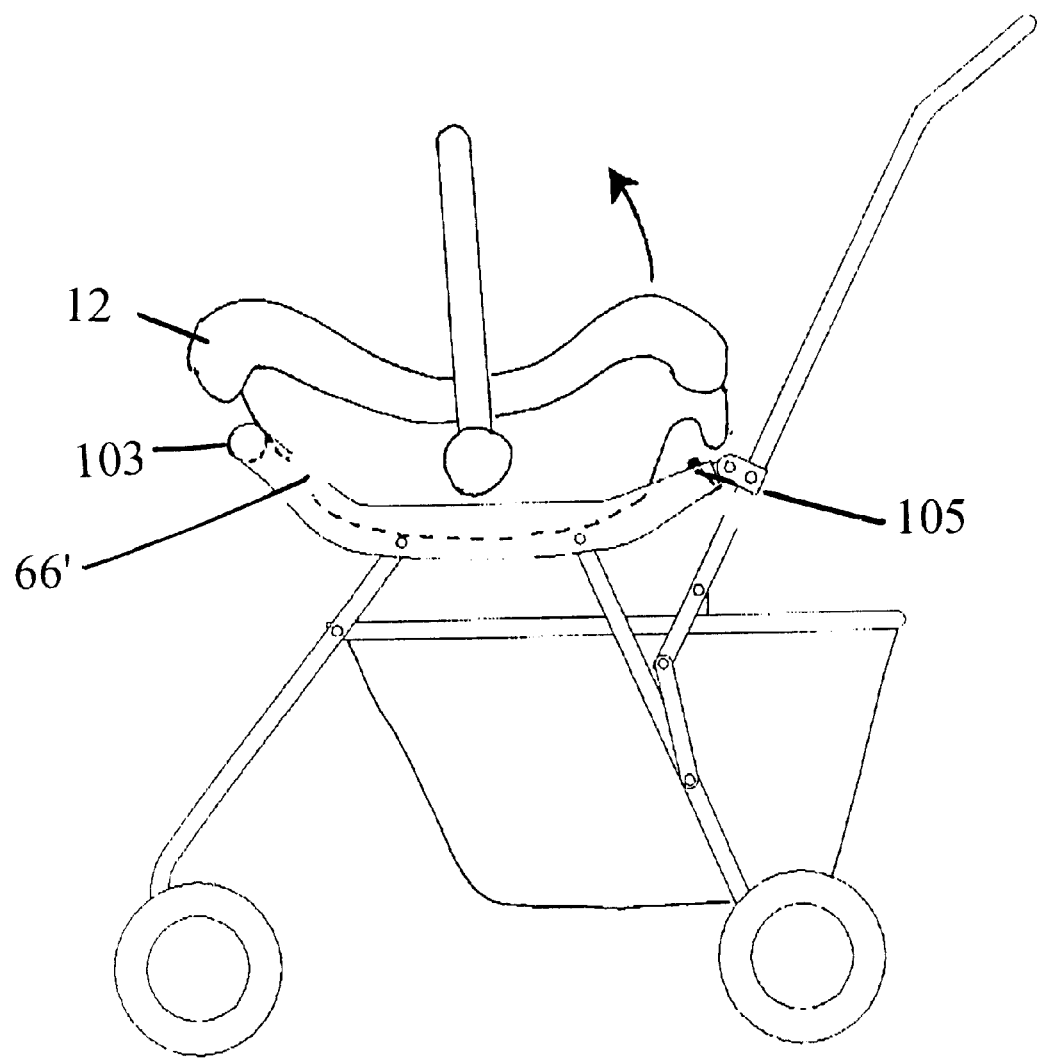
FIG. 16 is a side view of the stroller in accordance with the present invention in its operational state configured to prevent unwanted rotation of the child car seat.

As seen in FIG. 16, once the child's car seat 12 has been attached to stroller 10', the child's car seat 12 is prevented from unwantingly rotating around the hinge rod 66' by the U-shaped side bar mid-section 103, thus preventing the child's car seat 12 from accidentally flipping over the front of the stroller 10'.

As shown in a previous embodiment, (see FIGS. 5A, 5B and 5C) when certain child's car seats are located on the stroller 10' of FIG. 9A, by rotating the release lever 62' around the hinge rod 66', a plurality of tabs located on the child's car seat 12 may be disengaged from the hinge rod 66' and the child's car seat can be easily removed from the stroller 10'.

Figure 9B:
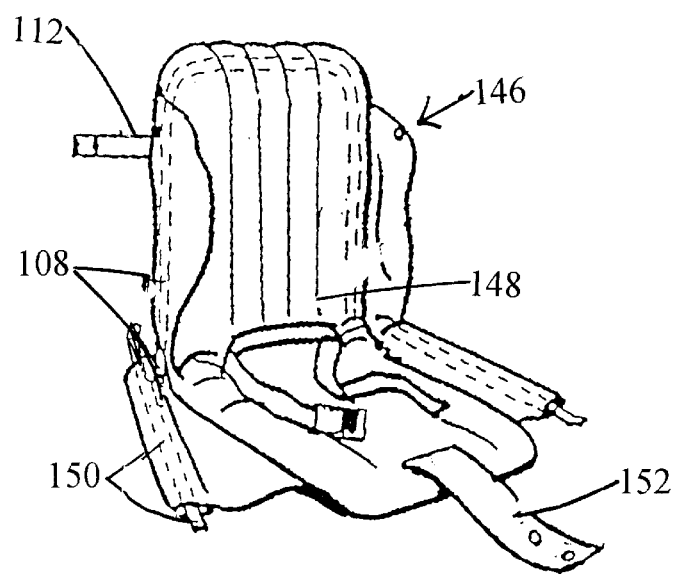
FIG. 9B is a perspective view of a seat assembly used to convert the stroller of FIG. 9A from the child's car seat carrier mode to the toddler stroller mode.
Figure 9C:
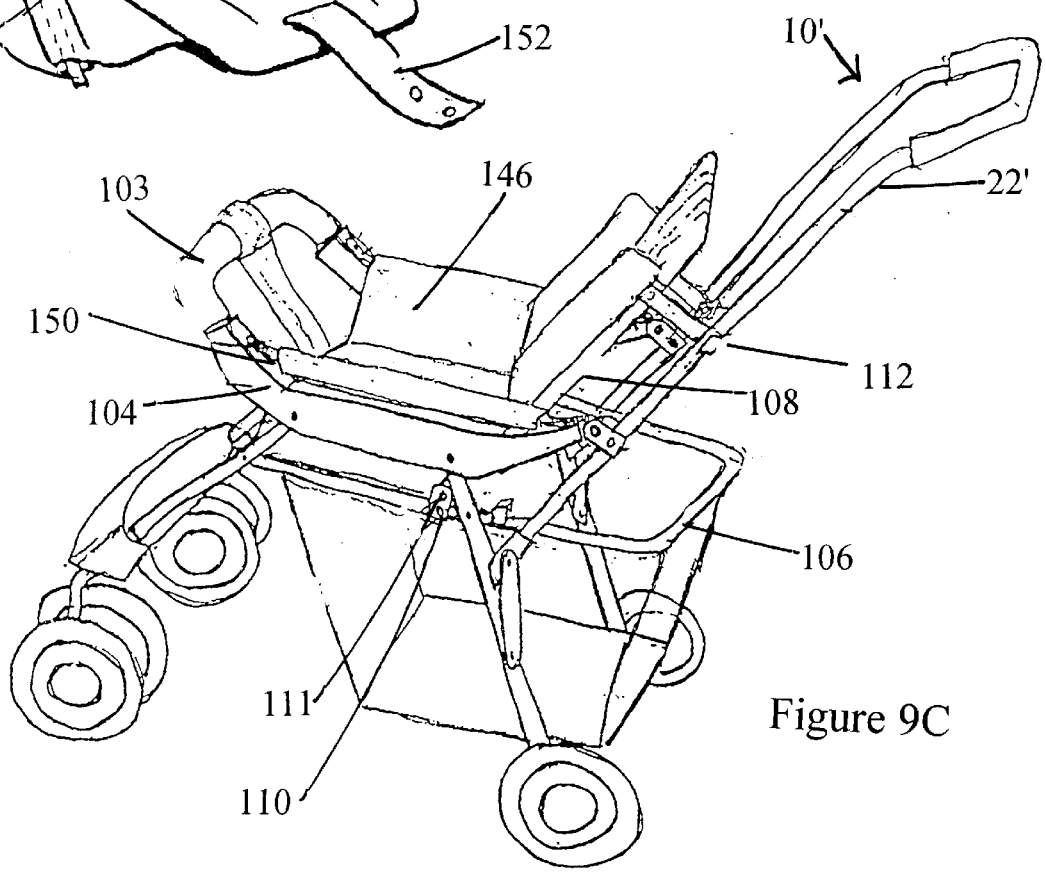
FIG. 9C is a perspective view of the stroller of FIG. 9A after receiving the seat assembly of FIG. 9B.

To convert the stroller 10' to its conventional child/toddler stroller mode (FIG. 9C) from its car seat carrier mode (FIG. 9A) the user removes the hinge rod 66', the release lever 62' and the rear cross bar 105, and installs the seat assembly 146 (FIG. 9B). The seat assembly 146 comprises a cloth seat cover 148 attached to a U-shaped seat bar 108, two arm rest bars 150, a strap 152, and two recline latches 112 attached to the U-shaped seat bar 108. To install the seat assembly 146 to the stroller 10', the user attaches the ends of the U-shaped seat bar 108 to the U-shaped basket bar 106 using a pivoting hinge 110 and a hinge pin 111. The user then screws two arm rest bars 150 to a set of accessory mounting holes 144 on the U-shaped side bar 102 (through the side covers 104). The user then fastens the strap 152 to the U-shaped side bar mid-section 103. In this embodiment of the conventional child/toddler stroller 10', the U-shaped side bar mid-section 103 functions as a restraint to keep the child in the stroller 10'.

The U-shaped seat bar 108 also has on each side a recline latch 112 which is used to convert the stroller between an upright seat position and a full recline position.

Figure 12:
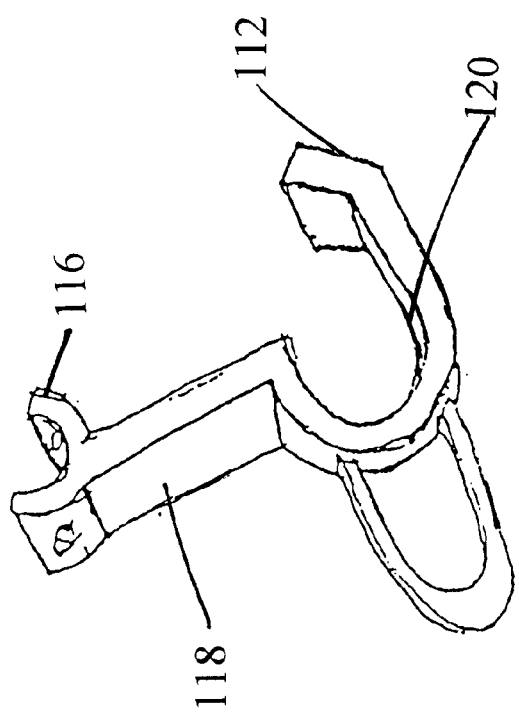
FIG. 12 is a detailed view of a recline latch used on the stroller of FIG. 9A.
Figure 15:
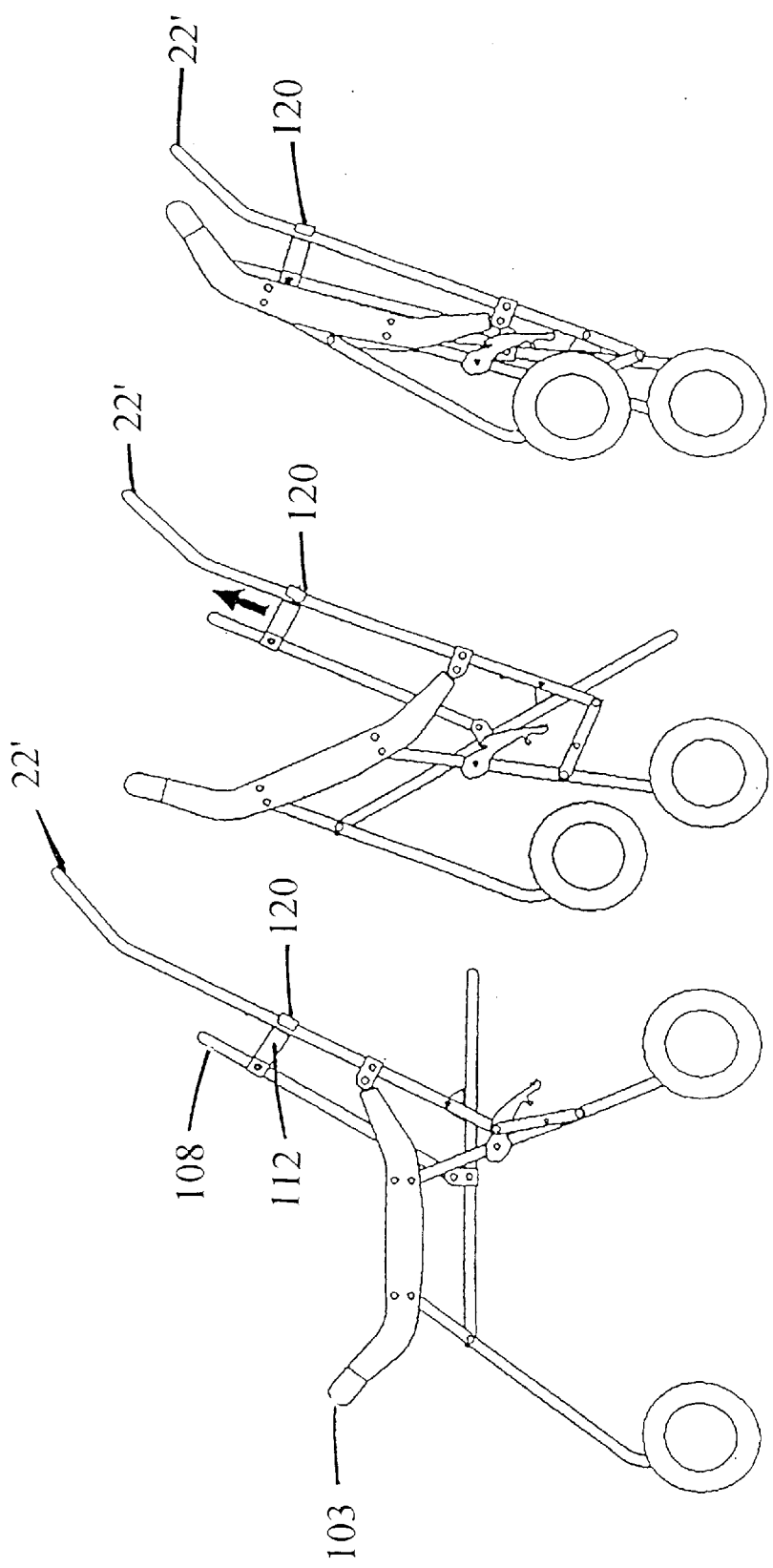
FIG. 15A is a side view of the stroller in FIG. 9C in the operational state.
FIG. 15B is a side view of the stroller in FIG. 9C in the intermediate state.
FIG. 15C is a side view of the stroller in FIG. 9C in the strong state.

As seen in FIG. 12, the recline latch 112 consists of a base 116, a neck 118, a hook 120 and a pull ring 122. As seen in FIG. 15A the hook 120 hooks around the U-shaped handle bar 22' to hold the U-shaped seat bar 108 in the upright seat position. As explained below, the recline latch 112 allows a stroller 10' to be converted from its operational state to its storage state and back to its operational state while still in the upright seat position.

Figure 13:
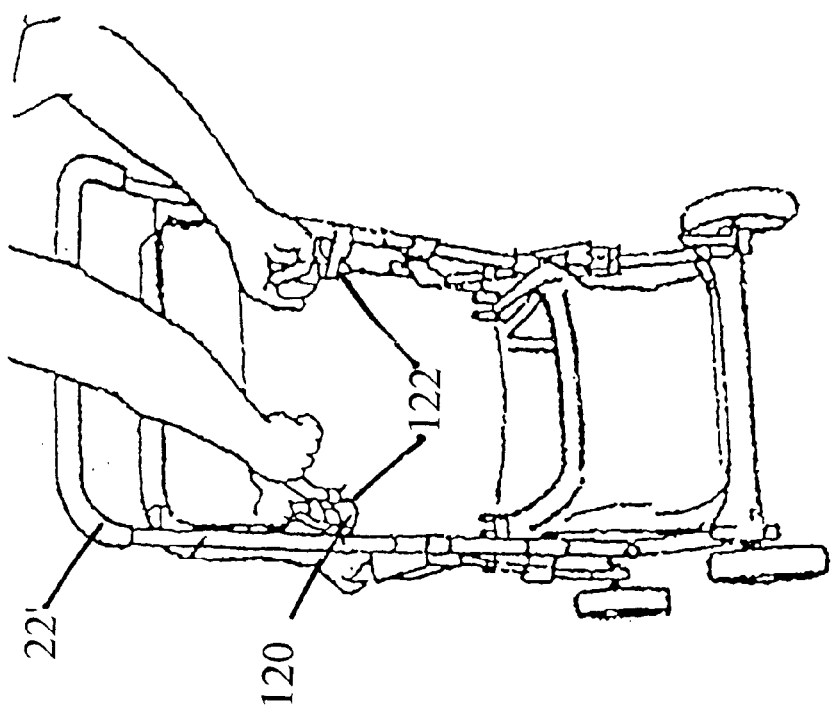
FIG. 13 is a rear view of the stroller in FIG. 9C in the upright seat position.
Figure 14:
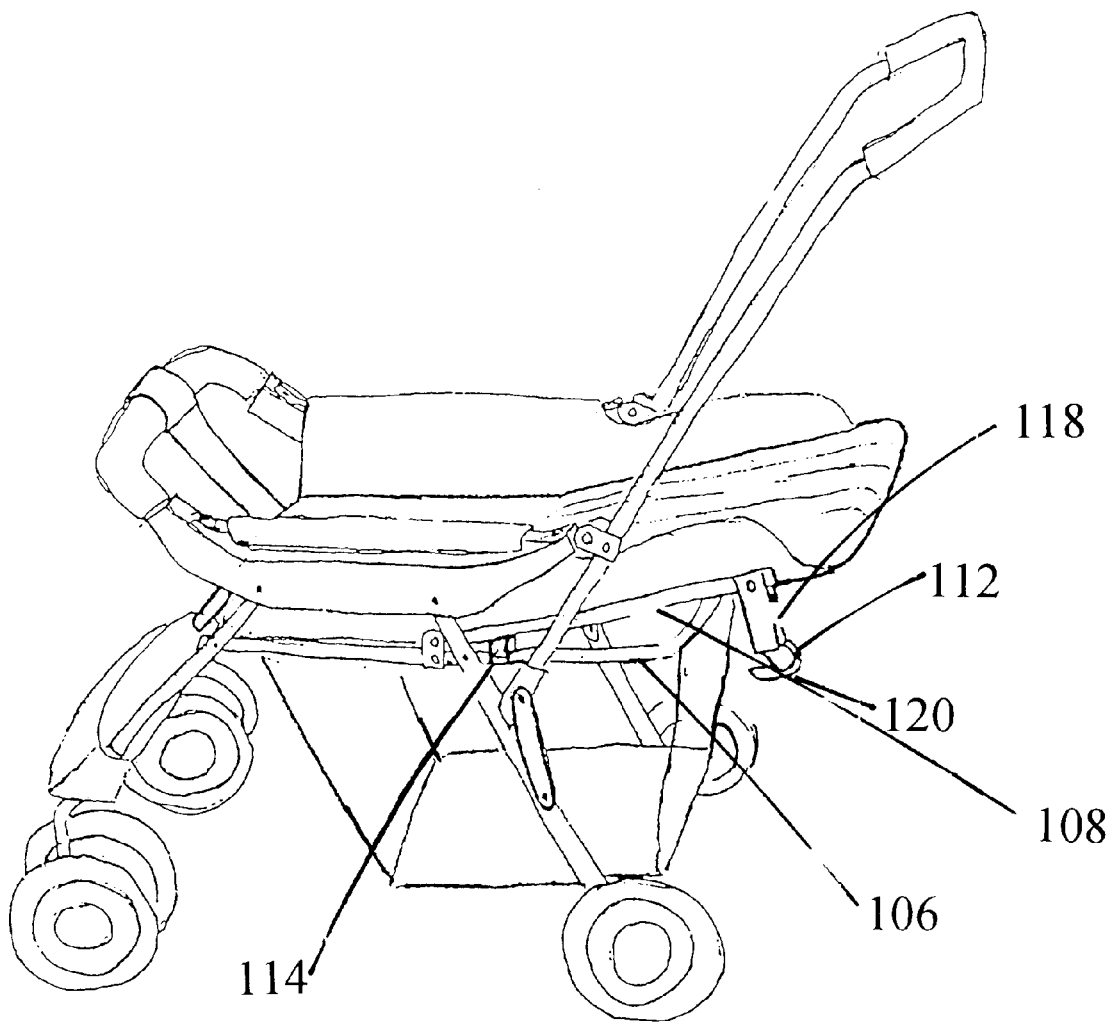
FIG. 14 is a perspective view of the stroller in FIG. 9C in the recline position.

As can be seen in FIG. 13 and 14, to convert the stroller 10' from the upright seat position to the full recline position, the user pulls the left and right pull rings 122 toward each other until the two hooks 120 are completely disengaged from the U-shaped handle bar 22'. Then, while still holding the pull rings 122, the user gently lets the U-shaped seat bar 108 pivot downward until it rests on the recline stops 114, which are located on each side of the U-shaped basket bar 106, and limit movement of the U-shaped seat bar 108 during the reclining action.

To convert the stroller 10' from the recline position to the upright seat position, the user continuously pushes up on the U-shaped seat bar 108 which pivots upward. As the neck 118 of the recline latch 112 contacts the U-shaped handle bar 22', it bends in a cantilever fashion to fit through the U-shaped handle bar 22' opening. Once the neck 118 moves completely beyond the U-shaped handle bar 22', it springs back and the hook 120 engages around the U-shaped handle bar 22'.

As can be seen in FIGS. 15A (side view of operational state, upright seat position, shown without seat cloth 148 and armrest bars 150 for clarity), 15B (intermediate state), and 15C (storage state) when the stroller 10' is converted from the operational state to the storage state with the U-shaped seat bar 108 in the upright seat position, the hook 120 of the recline latch 112 slides up along and remains engaged with the U-shaped handle bar 22' (see arrow). As the stroller 10' is subsequently converted from the storage state to the operational state, the hook 120 slides down along and remains engaged with the U-shaped handle bar 22'; thus maintaining the upright seat position.

It can be seen that the objects of the invention have been achieved by the structures and methods described above. It is to be understood that the present invention is not limited to the described embodiments, but may apply to modifications and variations obvious to a person having ordinary skill in the art.

We claim:

1. A stroller capable of accepting and supporting multiple types of child car seats and capable of converting from an operational state to a storage state comprising:

(a) a handle bar, (b) a rear wheel frame, (c) a back bar pivotally connected at one end to said handle bar and pivotally connected at another end to said rear wheel frame, (d) a latching mechanism located on said rear wheel frame, such that said latching mechanism engages said handle bar when said stroller is in said operational state and said latching mechanism is disengaged from said handle bar prior to converting said stroller from said operational state, wherein said stroller is capable of accepting and supporting multiple types of child car seats, to said storage state, and (e) a u-shaped side bar connected to said handle bar, a hinge rod connected to said u-shaped side bar, and a release lever rotatively connected to said hinge rod such that said release rod can rotate around said hinge rod.

2. A stroller capable of accepting and supporting multiple types of child's car seats and capable of converting from an operational state to a storage state comprising:

(a) a handle bar, (b) a rear wheel frame, (c) a back bar pivotally connected at one end to said handle bar and pivotally connected at another end to said rear wheel frame, (d) a latching mechanism located on said rear wheel frame, such that said latching mechanism engages said handle bar when said stroller is in said operational state and said latching mechanism is disengaged from said handle bar prior to converting said stroller from said operational state to said storage state, wherein said latching mechanism comprises a latch, a latch pin, a pivot pin and a holding pin, said latch being connected to said rear wheel frame by said pivot pin, said latch pin being located on said handle bar, and said holding pin being located on said back bar.

3. The stroller of claim 2 wherein said latch comprises a latch hook and a holding hook.

4. The stroller of claim 3 wherein said latch further comprises a foot pedal located at the end of said latch.

5. A stroller capable of accepting and supporting multiple types of child's car seats and capable of converting from an operational state to a storage state comprising:

(a) a handle bar, (b) a rear wheel frame, (c) a back bar pivotally connected at one end to said handle bar and pivotally connected at another end to said rear wheel frame, (d) a latching mechanism located on said rear wheel frame, such that said latching mechanism engages said handle bar when said stroller is in said operational state and said latching mechanism is disengaged from said handle bar prior to converting said stroller from said operational state to said storage state, and (e) a basket bar, a side bar and a seat assembly, said seat assembly comprising a seat cloth, a seat bar and a recline latch, said seat bar being pivotally mounted to said basket bar, such that said seat bar can detachably connect to said handle bar using said recline latch.

6. The stroller of claim 5 wherein said side bar comprises a plurality of accessory mounting holes for the mounting of a plurality of cross bars.

7. The stroller of claim 5 further comprising a side cover, said side cover being connected to said side bar, said side cover having through holes and a rear pivoting hinge hole for connecting said rear wheel frame.

8. The stroller of claim 5 wherein said recline latch comprises a base, a neck, a hook and a pull ring, said hook being capable of slidably engaging said handle bar and maintaining said engagement when said stroller converts from the storage state to the operational state.

9. A stroller capable of accepting and supporting multiple types of child's car seats and capable of converting from an operational state to a storage state comprising:

(a) a handle bar, (b) a rear wheel frame, (c) a back bar pivotally connected at one end to said handle bar and pivotally connected at another end to said rear wheel frame, (d) a latching mechanism located on said rear wheel frame, such that said latching mechanism engages said handle bar when said stroller is in said operational state and said latching mechanism is disengaged from said handle bar prior to converting said stroller from said operational state to said storage state, and (e) a side bar and a hinge rod such that said side bar prevents unwanted rotation of said child's car seat about said hinge rod.

10. The stroller of claim 19, wherein said U-shaped side bar comprises a U-shaped side bar mid-section located approximately in the center of said U-shaped side bar at the opposite end of said U-shaped side bar and handle bar connection.

11. A method of converting a stroller from an operational state to a storage state, said stroller being capable of accepting and supporting multiple types of child car seats and comprising a side bar, a handle bar, a foot pedal, a latch hook, a latch pin, a holding hook and a holding pin; which method comprises the steps of:

(a) placing pressure on said foot pedal thereby disengaging said latch hook from said latch pin, and engaging said holding hook with said holding pin;

(b) removing pressure from said foot pedal;

(c) moving said side bar upwardly and towards said handle bar thereby disengaging said holding hook from said holding pin.

\* \* \* \* \*

UNITED STATES PATENT AND TRADEMARK OFFICE
CERTIFICATE OF CORRECTION

PATENT NO.    : 6,189,914 B1
DATED         : February 20, 2001
INVENTOR(S)   : Ronald K. Worth and Eric G. Pfaff It is certified that error appears in the above-identified patent and that said Letters Patent is hereby corrected as shown below:

Claim 10,
Line 13, please change the number "19" to -- 9 --.

Claim 11,
Line 20, please change the word "child" to -- child's --.

Signed and Sealed this

Nineteenth Day of March, 2002

Attest:

Attesting Officer

JAMES E. ROGAN
Director of the United States Patent and Trademark Office